(12) United States Patent
Harrup et al.

(10) Patent No.: US 6,544,690 B1
(45) Date of Patent: Apr. 8, 2003

(54) SELF-DOPED MOLECULAR COMPOSITE BATTERY ELECTROLYTES

(75) Inventors: Mason K. Harrup, Idaho Falls, ID (US); Alan K. Wertsching, Idaho Falls, ID (US); Frederick F. Stewart, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/627,462

(22) Filed: Jul. 28, 2000

(51) Int. Cl.$^7$ ................................................ H01M 6/18
(52) U.S. Cl. ...................... 429/306; 429/320; 429/322; 252/62.2
(58) Field of Search ................................ 429/304, 305, 429/319–322; 252/62.2; 528/399; 525/538, 7.2

(56) References Cited

U.S. PATENT DOCUMENTS

| | | | |
|---|---|---|---|
| 4,722,877 A | * 2/1988 | Sammells | |
| 5,061,581 A | 10/1991 | Narang et al. | 429/129 |
| 5,219,679 A | 6/1993 | Abraham et al. | 429/192 |
| 5,567,783 A | * 10/1996 | Allcock et al. | |
| 5,609,974 A | 3/1997 | Sun | 429/192 |
| 6,020,087 A | 2/2000 | Gao | 429/192 |
| 6,190,806 B1 | * 2/2001 | Kumar et al. | |
| 6,201,100 B1 | * 3/2001 | Gorkovenko et al. | |

OTHER PUBLICATIONS

Ferrar, et al., "Polyphosphazene Molecular Composites", *Applied Organometallic Chemistry*, Chapter 20, pp. 258–267. (1994) No month.

Guglielmi, et al., "Poly(organophosphazene)s and the Sol–gel Technique", *Applied Organometallic Chemistry*, Chapter 13, pp. 339–351. (1999) no month.

Novak, "Hybrid Nanocomposite Materials–Between Inorganic Glasses and Organic Polymers," *Advanced Materials*, vol. 5, No. 6, pp. 422–433 (1993). No Month.

Coltrain, et al., "Polyphosphazene Molecular Composites. 1. In Situ Polymerization of Tetraethoxysilane", *Chemical Materials*, vol. 4 No. 2, pp. 358–364 (1992). No Month.

Coltrain, et al., "Polyphosphazene, Molecular Composites 1. In Situ Polymerization of Tetraethoxysilane" pp. 477–478. No date available.

Cotlrain, et al., "Polyphosphazene Moleular Composites. II. In Situ Polymerizations of Titanium, Zirconium and Aluminum Alkoxides", pp. 266–267. No date available.

* cited by examiner

*Primary Examiner*—Patrick Ryan
*Assistant Examiner*—Susy Tsang-Foster
(74) *Attorney, Agent, or Firm*—Pedersen and Co.

(57) ABSTRACT

This invention is in solid polymer-based electrolytes for battery applications. It uses molecular composite technology, coupled with unique preparation techniques to render a self-doped, stabilized electrolyte material suitable for inclusion in both primary and secondary batteries. In particular, a salt is incorporated in a nano-composite material formed by the in situ catalyzed condensation of a ceramic precursor in the presence of a solvated polymer material, utilizing a condensation agent comprised of at least one cation amenable to SPE applications. As such, the counterion in the condensation agent used in the formation of the molecular composite is already present as the electrolyte matrix develops. This procedure effectively decouples the cation loading levels required for maximum ionic conductivity from electrolyte physical properties associated with condensation agent loading levels by utilizing the inverse relationship discovered between condensation agent loading and the time domain of the aging step.

23 Claims, No Drawings

US 6,544,690 B1

SELF-DOPED MOLECULAR COMPOSITE BATTERY ELECTROLYTES

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

This invention relates generally to composite polymer-ceramic material for application as solid state battery electrolytes and, more specifically, to solid polymer electrolytes which are formed from the condensation of ceramic precursors in the presence of a polymer material utilizing a condensation agent comprised of a cation amenable to SPE applications.

2. Description of the Related Art

A battery typically comprises one or more electrochemical cells connected in series, parallel, or both, depending on desired output voltage and capacity. Each cell principally comprises an anode, a cathode, and an electrolyte. The electrolyte serves as the ionic conductor and provides the medium for the transfer of ions inside the cell between the anode and the cathode, and typically comprises liquid, solid, or gel materials. Some batteries are intended for single use, and once discharged are discarded (commonly termed as primary batteries). Other batteries are more readily designed to be recharged essentially to their original condition upon discharge (commonly termed as secondary or rechargeable batteries). During discharge, ions from the anode pass through the liquid electrolyte to the electrochemically active material of the cathode where the ions are taken up with the simultaneous release of electrical energy. During charging, the flow of ions is reversed so that ions pass from the electrochemically active cathode material through the electrolyte and are plated back onto the anode.

Solid polymer electrolytes are useful in numerous applications such as solid state batteries, supercapacitors, fuel cells, sensors, electrochromic devices and the like. Solid polymer electrolytes have been proposed in the past for use in place of liquid electrolytes in such equipment because they combine in one material the function of electrolyte, separator, and binder for the electrode materials, thereby reducing the complexity of the ultimate structure. The advantages inherent in the use of a solid polymer electrolyte (SPE) are the elimination of possible leakage and the preclusion of the possibility of dangerous increases in pressure which sometimes occur when volatile liquid electrolytes are present. Further, such SPEs can be fabricated as thin films which permit space efficient batteries to be designed. Also, flexible solid polymer electrolytes can be fabricated which allow for volume changes in the electrochemical cell without physical degradation of the interfacial contacts.

Development of useful all-solid state batteries requires significant improvement of solid polymer electrolyte materials. Foremost, the SPE must be an excellent conductor of ions at ambient temperatures, as high internal resistance is the most pressing problem in SPE batteries today. Current organic SPE systems are poor ion conductors at ambient temperatures and the most common strategy employed to combat this problem is to use small organic molecules as additives. See, for example, Abraham, et al., U.S. Pat. No. 5,219,679. While this strategy does result in increased ion transport, current commercial additives suffer from numerous problems such as flammability, toxicity, and a lack of oxidative stability. However, phosphazenes exhibit many favorable properties including high ion conductivity, oxidative stability, non-flammability and non-toxicity. Recent research has focused on improving the mechanical properties and ion transport abilities of polymeric phosphazenes.

Among the most pressing problems in solid polymer electrolytes for secondary battery applications, including phosphazenes, is that of cation loading, requiring a concominent anion for inclusion into the polymer matrix. This leads to two main problems: 1) anion migration in non-fixed anions; 2) cation stocking in chelating anionic sites that are fixed.

Additional problems with SPEs are low conductivity, low dimensional stability, and the manner in which mobile cations are introduced into the matrix. Current methods for addressing these problems are through the use of fillers and the introduction of ions as low lattice energy salts (e.g. triflates). See, for example, Gao, U.S. Pat. No. 6,020,087. While these approaches do improve performance characteristics, long-term stability and spectator anion problems have remained unsolved until the instant invention.

A number of SPEs have been suggested for use in the prior art such as thin films formed by complexation between lithium salt and linear polyethers. See, for example, Narang, et al., U.S. Pat. No. 5,061,581. Although these SPEs do have some significant properties, such as high electrochemical and chemical stability characteristics, as well as ease of fabrication in the form of thin films, they have not met with any appreciable commercial success because the conductivity of such electrolytes at ambient temperatures is poor. The need to restrict the use of such electrolytes to electrochemical devices at elevated temperatures clearly limits the number of possible useful applications.

Various attempts have been made to improve the ionic conductivity of polymer electrolytes by a selection of new polymeric materials such as cation conductive phosphazene and siloxane polymers. Other suggestions include the use of the addition of plasticizers to polymer electrolytes to form a gel electrolyte. See, for example, Sun, U.S. Pat. No. 5,609,974. While this procedure does improve ambient temperature conductivity, this is done at the expense of mechanical properties.

Attempts have also been made to improve the dimensional stability of phosphazene films (described by Ferrar et al., Polyphosphazene Molecular Composites, 20, 258–267 (1994)). Ferrar produced an anti-static film with improved dimensional stability while maintaining transparency and negative adhesion. Ferrar was not concerned with ionic conductivity, and said anti-static film did not exhibit sufficient ionic conductivity to serve as a commercially useful electrolyte.

To date, no commercially useful SPE has been developed in the form of a thin film that has good mechanical properties and ionic conductivity in the range of $10^{-4}$ S/cm at ambient temperatures, as well as enhanced electrochemical stability for use in, for example, a high energy, rechargeable solid state battery or for other applications in electrochemical units in which high ionic conductivity at ambient temperatures is a requirement.

Research to this end has expanded considerably in the development of solid polymer electrolytes for application in high energy density batteries. The prevailing theory of ionic conduction in polymer electrolytes teaches that ionic conductivity is facilitated by the large-scale segmental motion of the polymer and that ionic conductivity principally occurs in the amorphous regions of the polymer electrolyte. Crystallinity restricts polymer segmental motion and significantly reduces conductivity. Consequently, polymer electrolytes with high conductivity at room temperature have been sought through polymers which are highly flexible and have largely amorphous morphology. Originally, the ionic conductivity of complexes of alkali metal salts with poly (ethyleneoxide) was observed. Li salt complexes of polymers such as poly[bis(methoxyethoxyethoxy)phosphazene] (MEEP) and poly(ethoxy-ethoxy-ethoxy-vinyl ether) (described by Guglielmi et al., Appl. Organometal. Chem. 13, 339–351 (1999)), prepared on the basis of these principles, have shown room temperature conductivities of around $10^{-5}$ S/cm.

While the ionic conductivities of these polymers at ambient temperatures has been shown to fall within acceptable limits for battery applications, they suffer from physical drawbacks making them inappropriate for use as electrolytes. MEEP, for example, suffers from very low dimensional stability that prevents its extensive use in battery construction technology. At ambient temperature, MEEP is in the visco-elastic flow regime, and can therefore flow like a viscous liquid without retaining its form when subjected to an external force. For these reasons, the mechanical properties of MEEP need to be improved in order to facilitate its practical utilization.

SUMMARY OF THE INVENTION

The present invention is the fruit of the simultaneous development of three distinct research areas critical to the production of improved SPEs. The first development area is the synthesis of new polymeric materials, initially developed by improving upon the well known SPE, MEEP. The design of these novel materials enhances ion conductivity by increasing ion pair separation and ion mobility, thereby raising ion transference numbers. The net result is a reduction in the problem of cell polarization, increasing cell power output. The second area is a revolutionary new mechanical stabilization strategy which allows for physical stabilization of these fluid-like SPEs without a sacrifice in ionic conductivity that often accompanies conventional stabilization technologies, such as radiation induced crosslinking. The third area that we address is the development of performance enhancing additives. These inorganic-based additives are designed to enhance ionic conductivity while avoiding the pitfalls associated with organic solvents such as ethylene carbonate (EC). These three critical components are then properly blended to produce superior SPE thin membranes for assembly into practical electrochemical cells. Materials formed in the fashion of this invention possess all of the properties (physical stability, ionic conductivity, etc.) to make them superior battery electrolytes. Conductivity is not significantly attenuated as compared to the parent polymer. However, physical stability is greatly increased.

The primary breakthrough offered in this invention is in the area of cation inclusion into the electrolyte matrix. For example, a sample was prepared using LiOH as the condensation agent. Since lithium is the counterion in the condensation agent used in the formation of the molecular composite, it is already present as the electrolyte matrix develops. The novel invention loads the condensation agent and the charge carrying species in one step eliminating the need for further doping of the matrix. The anion associated with the charge carrying species is consumed as the matrix condenses leaving no mobile anions in the novel electrolyte. As a result, anion migration is eliminated. This technology also decouples the lithium loading levels required for maximum ionic conductivity from membrane physical properties associated with condensation agent loading levels by utilizing the inverse relationship discovered between condensation agent loading and the time domain in the aging step. The novel aging step of the instant invention permits the formation of a dimensionally stable electrolyte from a composition containing the requisite cation concentration for maximum conductivity.

The principle advantage of the invention is that the problem of cation inclusion into the electrolyte matrix has been solved. This will be evident in higher conductivity, higher current densities, greater stability, and better anticipated cycle life in electrochemical batteries.

It is an object of the present invention to provide a method of producing a superior SPE with high conductivity and superior physical properties, including high dimensional stability and good adhesion. The novel SPE has the requisite dimensional stability to act as an effective electrode separator while retaining the high conductivity required to act as an effective electrolyte for battery applications.

It is a further object of the invention to provide a method of producing a superior SPE which incorporates a novel method of introducing charge carrying cations into the matrix. The cations are introduced in a manner that allows for the removal of the original counterions, resulting in a self-doped membrane with superior ionic conductivity.

It is a further object of the invention to provide a superior SPE which is commercially useful and has been developed in the form of a thin film that has good mechanical properties and ionic conductivity in the range of $10^{-4}$ S/cm at ambient temperatures as well as enhanced electrochemical stability for use in, for example, a high energy, rechargeable solid state battery or for other applications in electrochemical units in which high ionic conductivity at ambient temperatures is a requirement.

DETAILED DESCRIPTION OF THE PREFERRED EMBODIMENTS

This invention describes a method of forming unique nano-composite polymer-ceramic materials for application as solid state battery electrolytes. The nano-composites are formed from the catalyzed, condensation of ceramic precursors; such as tetraethylorthosilicate (TEOS) in the presence of condensation agent and a polymer material, such as poly[(methoxyethoxyethoxy)phosphazene] (MEEP), utilizing a condensation agent comprised of a cation amenable to SPE applications, such as lithium hydroxide (LiOH). The technique allows the incorporation of a variety of polymer macromolecules into three dimensional ceramic networks. The polymer directs the morphology of the ceramic network as it forms and, in turn, the ceramic cage locks in the visco-elastic polymer component thereby forming a composite material with suitable dimensional stability. In this manner, the requisite physical stability to function as an electrode separator at ambient temperature is introduced to the parent polymer system while, simultaneously, the requisite doping of the material with the appropriate amount of cations is achieved to provide for facile ionic conduction. The real advance inherent in this technology lies in the ability of this methodology to simultaneously yet independently, be able to control both physical properties and cation loading of the electrolyte material. A further advance is that the cations are introduced in such a fashion that it allows for the removal of the original counterions that were present. This solves the problem of anion migration without necessitating strong ion coordinators such as carboxylate moieties.

The term ambient temperature as used herein describes temperatures in the range from about 15° C. to about 45° C., preferably temperatures in the range from about 18° C. to about 35° C. and more preferably temperatures in the range from about 20° C. to about 25° C.

The method of the present invention allows cations, for example $Li^+$, to be put into the polymer based electrolyte without anions that are free-floating. The anion, $OH^-$ for example, leaves the solution in the condensation step as HOH. This anion consumption is one of the keys to the present invention. Since the anions are consumed in the condensation step, the resulting polymer-ceramic electrolyte matrix is free of mobile anions. The residual charge balancing species to the remaining cations will vary depending upon the specific ceramic precursor used. If, for example, TEOS is used, the formal charge balancing is provided by the $Si—O^-$ sites.

In addition to having no mobile anions, the matrix of the present invention contains mobile cations. By using a condensation agent which contains a cation which is amenable to SPE applications, no further doping of the matrix is necessary. Cations which have been found to be amenable to SPE applications include $Li^+$, $Na^+$, and $Mg^+$. The condensation agent provides the charge carrier in the matrix. The cations are electrostatically bound through electronic adhesion throughout the matrix. No covalent bonds are formed. As such, the cations are relatively mobile as indicated by the high transference numbers for cations so bound. For example, when using LiOH as the condensation agent, MEEP as the polymer and TEOS as the ceramic precursor, the $Li^+$ cations are electrostatically bound at non-coordinating negative-zeta potential sites within the diffuse ceramic matrix (e.g. $Si_2^{\zeta+}O^{\zeta-}Li^+$), and along the polyphosphazene backbone (e.g. at the 'pocket' of negative-zeta potential which exists in the area above the nitrogen atoms and between the oxygen atoms attached to the phosphorus atoms of the polymer backbone). The $Li^+$ cations are also bound at discrete $Si—O—Li^+$ sites on the ceramic component.

The novel polymer-ceramic electrolyte molecular composite is formed using a condensation agent comprised of a cation amenable to SPE applications and a variable aging process. This allows for the battery requirements of cation loading to be set as needed. The cation loading requirement into the polymer-ceramic electrolyte is set by the performance characteristics of maximum ion conductivity as a function of cation loading. Maximum ion conductivity is determined empirically as a function of condensation agent loading level. This in turn fixes the amount of condensation agent to be used. The amount of aging determines the mechanical properties of the resulting membrane. Using the appropriate aging time allows the prerequisite cation loading requirement to be independent of membrane physical properties. The novel aging step makes it possible to form a dimensionally stable electrolyte with the requisite cation loading level required to achieve maximum ionic conductivity.

Scheme I (sample condensation reaction with a silicon based ceramic precursor)

Hydrolysis

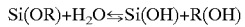

Condensation

The first step in formulating these materials is to form the molecular composite from an appropriate ceramic precursor and a given polymer. The ceramic precursor is condensed in situ, by means of a condensation agent with the solvated polymer in a solvent mixture that is miscible with both the polymer and the ceramic precursor. The necessary condensation agent, for example LiOH, is used at the appropriate level, as determined by the lithium loading requirement of a given system to achieve maximum ionic conductivity. This initial mother liquid is treated in an ultrasonic bath for a short time and then aged for the appropriate time in a sealed environment before being cast into moulds and formed into membrane materials. The aging time is predetermined based on the physical properties desired and the amount of condensation agent used due to conductivity performance strictures. The resulting molecular composite is then slowly cured at ambient temperatures followed by final heating and/or vacuum drying procedures as needed. By adroit use of the aging process, cation loading levels and membrane physical properties are effectively decoupled, allowing for appropriate tuning of each of these critical properties independently. In the drying process, all solvents and the organic portion of the ceramic precursors are removed. In addition, the counterion introduced with the condensation agent is removed in the drying process. For example, the hydroxyl ions introduced with the lithium condensation agent LiOH are removed after protonation and/or similar events. The result is an entrapment of the non-volatile lithium cations, with various sites within the ceramic superstructure acting as the charge balancing species.

The critical properties of the SPEs and additive materials were evaluated in several ways. First, ionic conductivity (measured in Siemens/cm) was assessed using AC electroimpedence spectroscopy (EIS) interfaced into a dry (<0.5 ppb water) argon glove box environment. Second, membrane dimensional stability was assessed in practical cell is assembly tests as well as by dynamic mechanical analysis. Third, the properties of the catalytic metal/SPE interface was assessed in two ways, both by repeated EIS analysis over extended time periods to simulate storage conditions and by disassembling the metal/SPE laminate after these tests for characterization by electron microscopy and solid state NMR imaging techniques.

The novel invention allows for all of the critical properties of the SPE membrane to remain within the optimal range for solid-state battery applications while simultaneously allowing condensation agent loading levels to be optimized so as to maximize conductivity. This is accomplished through the decoupling of condensation agent loading levels and SPE physical properties achieved by the novel use of the aging step. Requisite loading levels are determined empirically by determining which amount of condensation agent results in maximum conductivity. Said amount of condensation agent, however, normally results in a membrane with poor physical characteristics. The novel invention decouples the membrane physical characteristics from condensation agent loading levels through adroit use of the aging process. Aging is carried out in tightly sealed containers. The sealed environment allows for a kinetically sluggish (under-catalyzed) process to be completed without water escaping (See Scheme I). Upon curing, condensation is completed to form the desired membrane. Thus, controlling the amount of sealed aging allows for membrane physical properties and condensation agent loading levels to be determined independently.

Typical synthesis of the improved SPE involves dissolution of the polymer in an appropriate solvent. The polymers that may be employed are preferably polyether or polythioether containing phosphazenes, as well as polyether, and polythioether containing polysiloxanes. The solvent is any solvent which dissolves readily the ceramic precursors, polymers, and condensation agent. The solvent is preferably tetrahydrofuran (THF), or more preferably 50 wt. % THF/50 wt. % ethanol, or any other such solvent in which the ceramic precursor, the polymer, and the condensation agent are soluable, such as dimethoxyethane (DME), formic acid (FA), acetic acid (HOAc), methylacetate, alcohols (methanol, ethanol, isopropanol, etc.), acetone, and N,N-dimethylformamide (DMF).

The condensation agent is preferably lithium hydroxide (LiOH), which confers the specific advantage of no residual anions associated with the lithium cations within the composite matrix. However, other condensation agent, such as lithium ditrifluorimide will also effectively produce novel materials applicable to battery electrolytes. In particular, it has been found that condensation agent containing lithium, sodium, or magnesium provide cations amenable to facile ionic conduction in SPE applications.

To the polymer solution is added an appropriate ceramic precursor, for example TEOS. The solution is mechanically agitated and heated in an ultrasonic bath. The specific heating conditions and length of ultrasonic treatment vary depending on the formulation of the molecular composite.

The solution is then aged at room temperature for an appropriate amount of time. The length of aging time significantly influences the mechanical properties of the final product. The longer that the precursor solution is aged, the more rigid (brittle) the material becomes. Some aging is necessary, however, to render a mechanically stable product, but too much aging is detrimental. The exact length of aging time again depends on the exact formulation of the molecular composite.

The solution is aged in tightly sealed containers. The containers are tightly sealed so that no volatiles may escape. While aging, the (OR) groups from the ceramic precursor are exchanged for hydroxyls from water molecules and the thus hydroxalated precursor then condenses to form a ceramic material. Under sealed conditions, due to the lack of evaporative pressure, the rate of condensation is slowed (See Scheme I).

Once properly aged, the solution is poured into moulds for curing. During the curing process further condensation occurs to form the ceramic matrix. Appropriate moulds are used so as to form a thin membrane of the desired dimensions. The amount of time and rate of the curing process must be carefully controlled to prevent inhomogeneities in the final material. Also, a final drying step, involving heating and/or vacuum treatment is sometimes needed.

The structural properties and ionic conductivities of the resulting membranes are tested and compared to membranes prepared by other methods, notably acid addition. The novel, self-doped membrane outperforms the others in terms of conductivity when tested using EIS, even though there is no anion mobility component possible in the measurement.

The present invention may be better understood by reference to the following example which is intended for purposes of illustration and is not to be construed as in any way limiting the scope of the present invention, which is defined in the claims appended hereto.

EXAMPLE 1

Three sample SPEs were prepared in the following manner:

SAMPLE 1

In a vial, 300 mg of the parent polymer (MEEP) is dissolved into 10.0 ml of solvent (5.0 ml dry THF (tetrahydrofuran) and 5.0 ml dry ethanol) that contains 50 $\mu$l of 1.0 M LiOH. To this is added 360 $\mu$l of TEOS and the solution is mechanically agitated to ensure good mixing. The vial is then heated in an ultrasonic bath for 15 minutes at 50° C. The vial is then stored at room temperature, tightly sealed, for 32 hours. After this time, the solution is poured into Teflon® moulds to dry, thus forming thin membranes of the desired dimensions. The original membranes are then placed between SS316 electrodes and their conductivity tested by AC electroimpedance spectroscopy at ambient temperatures (about 20–25° C.).

SAMPLE 2

In a vial, 300 mg of the parent polymer (MEEP) is dissolved into 10.0 ml of solvent (5.0 ml dry THF and 5.0 ml dry ethanol). To this is added 360 $\mu$l of TEOS and the solution is mechanically agitated to ensure good mixing. To this is added 25 mg of LiBF$_4$ in 0.5 ml of THF. Next, 150 $\mu$l of concentrated NH$_4$OH (aq) is added. The vial is then heated in an ultrasonic bath for 15 minutes at 50° C. The vial is then stored at room temperature, tightly sealed, for 32 hours. After this time, the solution is poured into Teflon® moulds to dry, thus forming thin membranes of the desired dimensions. The original membranes are then placed between SS316 electrodes and their conductivity tested by AC electroimpedance spectroscopy at ambient temperatures (about 20–25° C.).

SAMPLE 3

In a vial, 300 mg of the parent polymer (MEEP) is dissolved into 10.0 ml of solvent (5.0 ml dry THF and 5.0 ml dry ethanol). To this is added 360 $\mu$l of TEOS and the solution is mechanically agitated to ensure good mixing. To this is added 25 mg of LiBF$_4$ in 0.5 ml of THF. Next, 150 $\mu$l of 0.15 M HCl (aq) is added. The vial is then heated in an ultrasonic bath for 15 minutes at 50° C. The vial is then stored at room temperature, tightly sealed, for 32 hours. After this time, the solution is poured into Teflon® moulds to dry, thus forming thin membranes of the desired dimensions. The original membranes are then placed between SS316 electrodes and their conductivity tested by AC electroimpedance spectroscopy at ambient temperatures (about 20–25° C.).

The results of the EIS testing of each sample are summarized in Table 1, below.

TABLE 1

| sample | 1 (self-doped) | 2 (base catalyzed) | 3 (acid catalyzed) |
|---|---|---|---|
| avg. thickness ($\mu$m) | 60 | 120 | 50 |
| area (cm$^2$) | 9 | 10.89 | 10.87 |
| conductivity ($\mu$S/cm) | 113.0 | 7.0 | 1.0 |

Note that the conductivity is significantly higher in the self-doped sample. Dynamic mechanical analysis of Sample 1 revealed that the sample maintains dimensional stability (does not flow) under pressures of up to 500 g/cm$^2$. Additional analysis of Sample 1 revealed that no identifiable mobile anions were present in the matrix.

In compliance with the statute, the invention has been described above with reference to particular means, materials and embodiments. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of making a composite solid polymer electrolyte comprised of a mobile charge-carrying species in a nano-composite material formed by the condensation of a ceramic precursor in the presence of a polymer, the method comprising:

providing a mixture of solvated polymer and ceramic precursor;

adding a condensation-agent, comprising a cation selected from the group consisting of Li+, Na+, and Mg+ and an OH$^-$ anion associated with the cation, to the mixture so that condensation of the ceramic precursor takes place to form the nano-composite material;

forming the nano-composite material into a membrane; and drying the membrane;

wherein said cation is mobile within the nano-composite material to be the mobile charge-carrying species.

2. The method as in claim 1 wherein the ceramic precursor is a metal alkoxide.

3. The method as in claim 2, wherein the metal alkoxide is selected from the group consisting of silicon alkoxides, titanium alkoxides, zirconium alkoxides, aluminum alkoxides, and mixtures thereof.

4. The method as in claim 2, wherein the metal alkoxide is selected from the group consisting of tetraethylorthosilicate, tetraisopropoxyorthotitanate, zirconium n-butoxide butanol complex, aluminum tri-sec butoxide, and mixtures thereof.

5. The method as in claim 1, wherein the polymer is selected from the group consisting of polyphosphazenes, polysiloxanes and mixtures thereof.

6. The method as in claim 5, wherein the polymer is selected from the group consisting of polyether containing phosphazenes, polythioether containing phosphazenes, polyether containing polysiloxanes and polythioether containing polysiloxanes.

7. The method as in claim 5, wherein the polymer is poly((methoxyethoxyethoxy)phosphazene) (MEEP).

8. A composite solid polymer-ceramic electrolyte, for use in a battery, made by the method of:

providing a mixture of solvated polymer and ceramic precursor;

adding a condensation-agent, comprising a cation selected from the group consisting of Li+, Na+, and Mg+ and an OH$^-$ anion associated with the cation, to the mixture so that condensation of the ceramic precursor takes place to form a nano-composite material which is characterized by exhibiting a conductivity of at least 10$^{-4}$ S/cm at 20–25° C.

9. A composite solid polymer-ceramic electrolyte as in method as in claim 8, wherein the ceramic precursor is a metal alkoxide.

10. A composite solid polymer-ceramic electrolyte as in claim 9, wherein the metal alkoxide is selected from the group consisting of silicon alkoxides, titanium alkoxides, zirconium alkoxides, aluminum alkoxides, and mixtures thereof.

11. A composite solid polymer-ceramic electrolyte as in claim 9, wherein the metal alkoxide is selected from the group consisting of tetraethylorthosilicate, tetraisopropoxyorthotitanate, zirconium n-butoxide butanol complex, aluminum tri-sec butoxide, and mixtures thereof.

12. A composite solid polymer-ceramic electrolyte as in claim 8, wherein the polymer is selected from the group consisting of polyphosphazenes, polysiloxanes and mixtures thereof.

13. A composite solid polymer-ceramic electrolyte as in claim 8, wherein the polymer is selected from the group consisting of polyether containing phosphazenes, polythioether containing phosphazenes, polyether containing polysiloxanes and polythioether containing polysiloxanes.

14. A composite solid polymer-ceramic electrolyte as in claim 8, wherein the polymer is poly((methoxyethoxyethoxy)phosphazene) (MEEP).

15. A composite solid polymer-ceramic electrolyte as in claim 8, which is characterized by not flowing when subjected to pressures of at least 500 g/cm$^2$ at 20–25° C.

16. A battery comprising an electric current producing electrochemical cell, said cell comprising an anode, a cathode, and an electrolyte disposed between the anode and cathode and in ionically conductive contact therewith, said electrolyte being a composite solid polymer-ceramic electrolyte comprised of a mobile charge-carrying species in a nano-composite material formed by the condensation of a ceramic precursor in the presence of a polymer, the composite solid polymer-ceramic electrolyte made by the method of:

providing a mixture of solvated polymer and ceramic precursor;

adding a condensation-agent, comprising a cation selected from the group consisting of Li+, Na+, and Mg+ and an OH$^-$ anion associated with the cation, to the mixture so that condensation of the ceramic precursor takes place to form a nano-composite material with said cation being mobile within the nano-composite material as the mobile charge-carrying species for the composite solid polymer-ceramic electrolyte;

forming the nano-composite material into a membrane; and drying the membrane;

wherein the electrolyte is characterized by exhibiting a conductivity of at least 10$^{-4}$ S/cm at 20–25° C.

17. A battery as in claim 16, wherein the ceramic precursor is a metal alkoxide.

18. A battery as in claim 17, wherein the metal alkoxide is selected from the group consisting of silicon alkoxides, titanium alkoxides, zirconium alkoxides, aluminum alkoxides, and mixtures thereof.

19. A battery as in claim 17, wherein the metal alkoxide is selected from the group consisting of tetraethylorthosilicate, tetraisopropoxyorthotitanate, zirconium n-butoxide butanol complex, aluminum tri-sec butoxide, and mixtures thereof.

20. A battery as in claim 16, wherein the polymer is selected from the group consisting of polyphosphazenes, polysiloxanes and mixtures thereof.

21. A battery as in claim 16, wherein the polymer is selected from the group consisting of polyether containing phosphazenes, polythioether containing phosphazenes, polyether containing polysiloxanes and polythioether containing polysiloxanes.

22. A battery as in claim 16, wherein the polymer is poly((methoxyethoxyethoxy)phosphazene) (MEEP).

23. A battery as in claim 16, wherein the electrolyte is characterized by exhibiting a conductivity of at least $10^{-4}$ S/cm at 20–25° C., and which is characterized by not flowing when subjected to pressures of at least 500 g/cm$^2$ at 20–25° C.

* * * * *